United States Patent [19]

Nomura

[11] Patent Number: 4,708,233
[45] Date of Patent: Nov. 24, 1987

[54] METHOD AND APPARATUS FOR ARRANGING CAPPED CAPSULES IN A SINGLE DIRECTION

[75] Inventor: Kohei Nomura, Kobe, Japan

[73] Assignee: Kabushiki Kaisha Osaka Jidoki Seisakusho, Osaka, Japan

[21] Appl. No.: 867,428

[22] Filed: May 15, 1986

Related U.S. Application Data

[62] Division of Ser. No. 549,814, Nov. 8, 1983, abandoned.

[30] Foreign Application Priority Data

Sep. 30, 1983 [JP] Japan ................................. 58-183302

[51] Int. Cl.⁴ ............................................. B65G 47/24
[52] U.S. Cl. ...................................... 198/397; 198/399
[58] Field of Search ............... 198/383, 384, 397, 399, 198/400, 390, 392; 221/171, 173

[56] References Cited
U.S. PATENT DOCUMENTS

| | | | |
|---|---|---|---|
| 2,917,156 | 12/1959 | Pollman | 198/488 |
| 3,135,373 | 6/1964 | Scarf | 198/488 X |
| 3,817,423 | 6/1974 | McKnight | 198/392 |
| 3,933,239 | 1/1976 | Yoshida | 198/384 |
| 4,091,600 | 5/1978 | Itoh | 198/400 X |
| 4,174,775 | 11/1979 | McKnight et al. | 198/397 |
| 4,266,477 | 5/1981 | Ackley | 198/384 X |
| 4,353,456 | 10/1982 | Yamamoto | 198/397 |

*Primary Examiner*—Robert J. Spar
*Assistant Examiner*—D. Glenn Dayoan
*Attorney, Agent, or Firm*—Wenderoth, Lind & Ponack

[57] ABSTRACT

A method and an apparatus for arranging capped capsules in a single direction, whereby many capped empty capsules are put one by one into receiving holes which are moving mechanically and while capped empty capsules are being moved, those which were put in with their cap facing upwardly are left to move as they are but those which were put in with their cap facing downwardly are turned upside down so that capped empty capsules facing in the same direction can be supplied to a filling machine.

3 Claims, 6 Drawing Figures

1

4,708,233

2

METHOD AND APPARATUS FOR ARRANGING CAPPED CAPSULES IN A SINGLE DIRECTION

This application is a division of now abandoned application Ser. No. 549,814, filed Nov. 8, 1983 now abandoned.

BACKGROUND OF THE INVENTION

This invention relates to a method and an apparatus for arranging capped capsules in a single direction, whereby many capped empty capsules are put one by one into receiving holes which are moving mechanically and while capped empty capsules are being moved, they are divided into those with caps facing upwardly and those with caps facing downwardly and the former being left to move as they are but the latter being turned upside down so that capped empty capsules facing in the same direction can be supplied to a filling machine.

DESCRIPTION OF THE PRIOR ART

Even at this time when capsules are filled with medicines or the like automatically, mechanically and at high efficiency, no apparatus is available for orienting capped empty capsules automatically and it has been necessary to arrange the directions of caps manually before supplying capped empty capsules to a filling machine. This involves poor operation efficiency and requires much labor. Although some machines have been developed to orient capsule caps in a definite direction mechanically, from the nature of a capsule, since it is very light in weight, is liable to generate static electricity, must be kept absolutely from soiling, and so on, it has been difficult to effect mechanical orientation of cap direction efficiently.

SUMMARY OF THE INVENTION

In view of the above disadvantage, this invention has for its object to provide a method and an apparatus for arranging randomly oriented capped capsules in a single direction mechanically, automatically and at high efficiency so that at the succeeding processes uncapping, putting of a medicine or the like into a capsule body and capping may be done mechanically, automatically and at high efficiency.

BRIEF DESCRIPTION OF THE DRAWINGS

The attached drawings show preferred embodiments of the present invention. In the drawings.

DETAILED DESCRIPTION OF THE PREFERRED EMBODIMENTS

Embodiment 1

Figure 1:
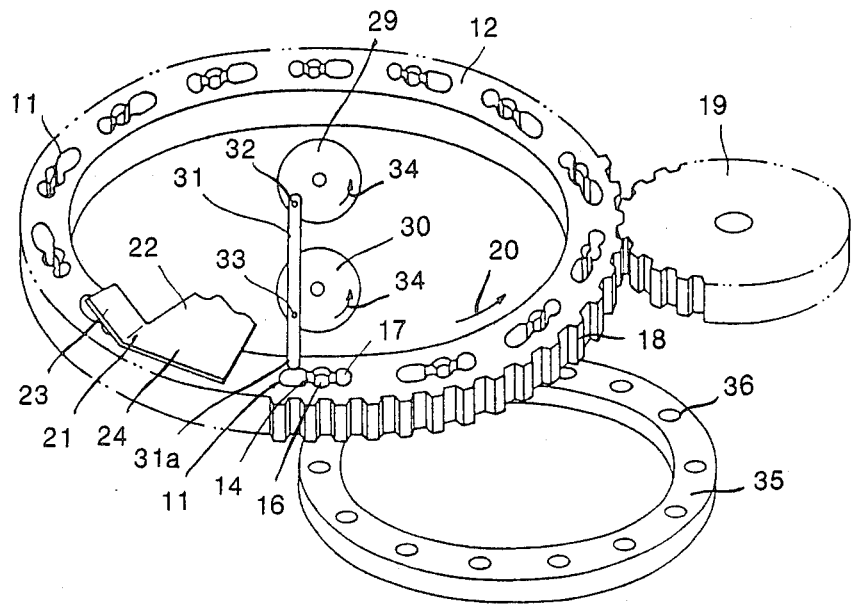
FIG. 1 is a perspective view of a mechanism of horizontally rotating system.
Figure 2:
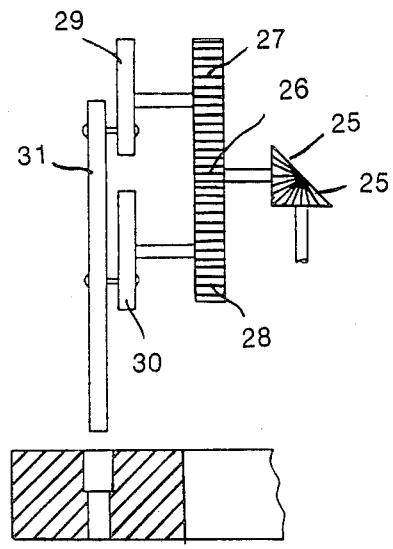
FIG. 2 is a side elevation, partly cut away, showing the relation between the vertically movable rod and the capsule receiving hole.
Figure 3:
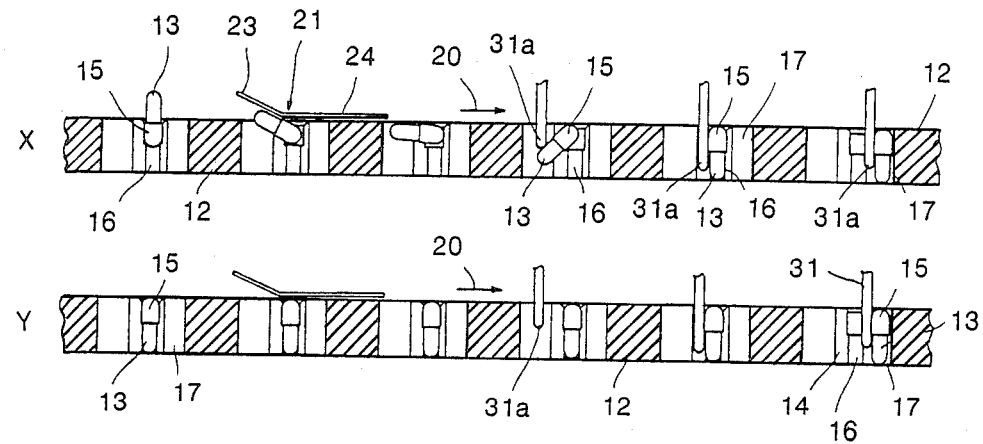
FIG. 3 is an exploded sectional view, illustrating the movement of capsules, in which X is the case where a capsule is put in with its cap facing downwardly and Y is the case where a capsule is put in with its cap facing upwardly.

This embodiment is a horizontally rotating system and is shown in FIG. 1-FIG. 3. Numeral 11 denotes many capsule receiving holes made in the outer circumferential part of a rotary body 12. The hole 11 comprises a starting portion or a smaller diameter portion 14 in which a capsule body 13 can enter, the small diameter portion 14 adjacent to and opening into an intermediate portion or a composite portion 16, the upper half of which has a diameter large enough to allow a capsule cap to pass therethrough and the lower half of which has a diameter to allow only a capsule body to pass therethrough, and the composite portion 16 adjacent to and opening into a terminal portion 17 having a larger diameter large enough to allow the cap 15 to pass therethrough. Numeral 18 are teeth made at the outer periphery of the rotary body 12. Numeral 19 is a transmission gear which is provided relative to a motive power part (not shown in the drawings) and moves the rotary body 12 in the direction indicated by the arrow 20. Numeral 21 is a pusher guiding plate, with its base part 22 fixed to the machine frame, its extreme top end forming an inclined part 23 in the diagonally upward direction and the other part of its top end forming a plane part 24 fixed adjacent the surface of the receiving hole 11. Numeral 25 is a bevel gear which is connected to a motive machine and is so arranged that it interlocks an upper gear 27 and a lower gear 28 through the medium of a transmission gear 26. Numeral 29 is an upper rotary plate. Numeral 30 is a lower rotary plate. These two rotary plates are turned by means of the upper gear 27 and the lower gear 28 respectively. Numeral 31 is a vertically movable rod which is pivotally secured to the eccentric positions 32, 33 of both rotary plates 29, 30 respectively. With the turning of the rotary plates 29, 30 in the direction indicated by the arrow 34, the rod 31 begins to assume a perpendicular posture and causes its lower half part to do rising and falling motion while moving its lowermost part 31a in the direction indicated by the arrow 20. Numeral 35 is a capsule receiving disk which is so provided that it turns in close vicinity to the lower surface of the rotary body 12 and has capsule receiving holes 36, each made at the position corresponding to the position immediately below the larger diameter portion 17 of the hole 11 which has come round.

This embodiment is constructed as stated above. Let us suppose that capsules are put, irrespective of top and bottom, in the composite portion 16 of the receiving hole 11 positioned at the extreme left end in FIG. 3. Since the upper half of the composite portion 16 has a larger diameter large enough to allow the cap 15 to enter therein but the lower half of it has a smaller diameter to allow only the capsule body to enter therein, among capsules put in the hole those which have been put in with their cap facing downwardly present such appearance that, as shown in X of FIG. 3, only the cap 15 is inserted in the upper part of the hole 11 and the capsule body is exposed above the rotary body 12. Under such appearance, if the rotary body 12 turns further in the direction indicated by the arrow 20, the capsule body 13 is unable to maintain its upright position because of the existence of the inclined part 23 of the pusher guiding plate 21 above against which the capsule body 13 moves. Thus, as shown in X of FIG. 3, the capsule body 13 comes down in the direction of smaller diameter portion while the cap 15 is still kept in the composite portion 16 and the capped capsule will present an appearance of lying down between 16 and 14. With further turning of the rotary body 12, the capsule body 13 of the lying down capped capsule comes immediately below the vertically movable rod 31. At this time, since the lower end of the rod 31 is moving in the rightward direction in the drawing as it is descending, as shown in X of FIG. 3, the body 13 moves rightward as it is descending diagonally the smaller diameter portion 14 until the cap 15 and the body 13 stand upright in the composite portion 16. Then the vertically movable rod 31 moves further to the right as it is shifting to the rising motion and the upright capped capsule is pushed as it is toward the larger diameter portion 17 which allows a cap to pass therethrough, where the capped capsule falls downwardly and is received, with its cap facing upwardly, in the capsule receiving hole 36 of the capsule receiving disk 35 which is waiting for it below.

On the other hand, among capsules put in the hole those which have been put in with their cap facing upwardly are inserted in their entirety in the composite portion 16, as shown in Y of FIG. 3, and move as they are in the direction indicated by the arrow 20 and then pushed at their side to the right by the vertically movable rod 31 toward the larger diameter portion 17 where they fall downwardly, with their cap facing upwardly, into the capsule receiving hole waiting for it below.

Embodiment 2

Figure 5:
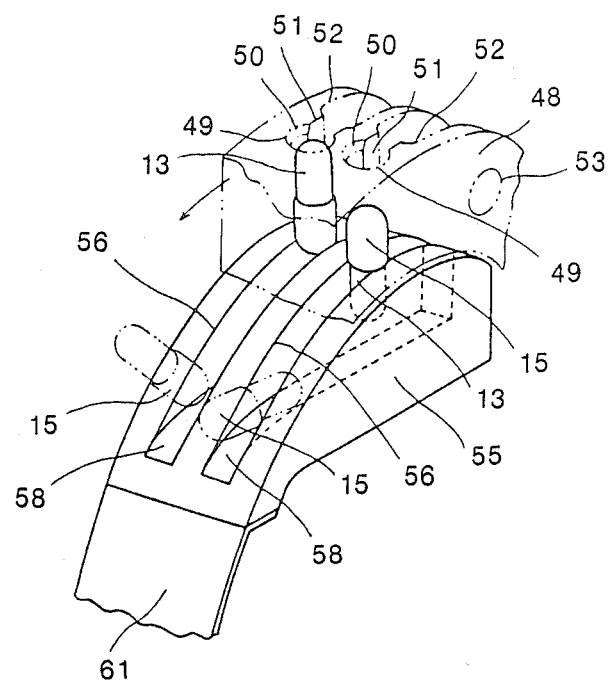
FIG. 5 is a perspective view of the capsule putting in position of the drum system, partly cut away.
Figure 4:
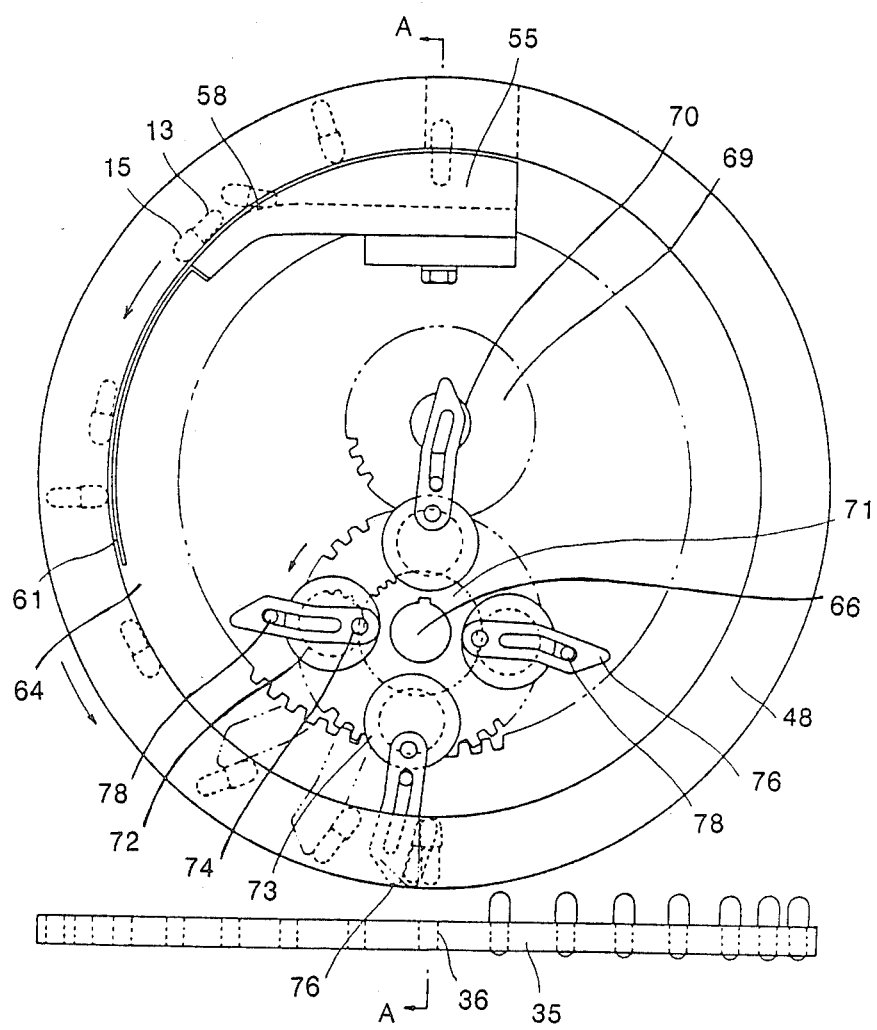
FIG. 4 is a side elevation of a drum system of this invention.
Figure 6:
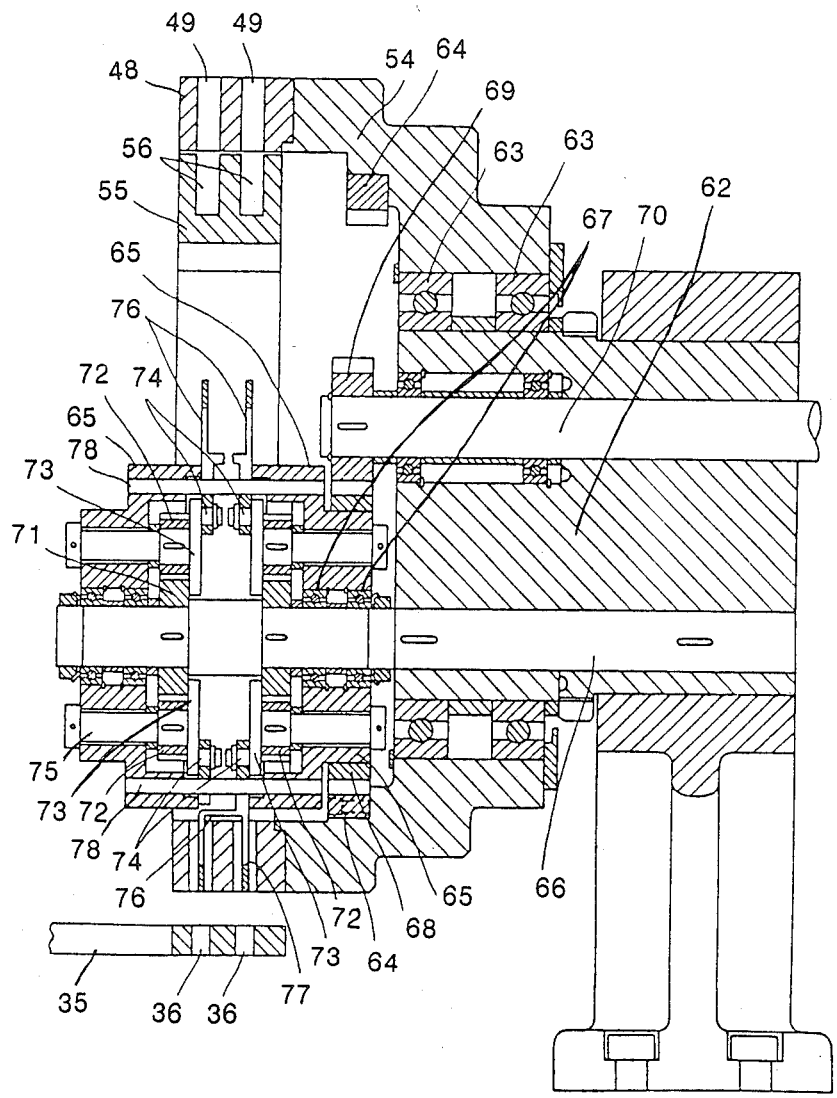
FIG. 6 is a cross section, taken on line A—A of FIG. 4.

This embodiment is of drum type and is shown in FIG. 4–FIG. 6. Numeral 48 denotes a direction adjusting drum and capsule receiving holes 49, 49 in two rows are made in the cylindrical outer circumference divided equally. Numeral 50 is a chamfered entrance of each capsule receiving hole 49. Numeral 51 is a groove for direction adjusting. This groove 51 has a width which is slightly smaller than the outside diameter of the cap 15 and connects to a slit 52 for capsule lateral turning, the slit having a width slightly larger than the outside diameter of the cap 15 and the capsule receiving hole 49. Numeral 53 is a drum fitting hole provided at the side of the drum and is fixed removably to the top end of a drum fitting member 54.

Capsules of five different diameters are used generally and the drum is made detachable so that a drum corresponding to each diameter of capsule can be used. Numeral 55 is a capsule tumbling plate provided along the undersurface of the upper part of the drum 48. Capsule body 13 fitting in grooves 56, 56 are passed over said capsule tumbling plate. This tumbling plate 55 is stationary even when the drum 48 turns. An inverted capsule, with its cap facing upwardly away from the axis of rotation of the drum, sinks with its body 13 fitting in groove 56. Since there is the tumbling plate 55 having the upper surface 58 of gradually rising inclination at the bottom of the groove 56, the capsule body 13 which has been upright in the capsule receiving hole 49 is pushed up or overturned to a semi-inverted position upon contact with said inclined upper surface 58 and is tumbled in the slot 52 for capsule lateral turning with its cap ahead facing the direction of rotation of the drum and is shifted with the turning of the drum 48. On the other hand, in the case of a capsule with its cap 15 facing downwardly toward the axis of rotation of the drum, the cap 15 with a larger diameter does not fit in the groove 56 in the tumbling plate 55 which is below the drum and has a smaller width but with the turning of the drum 48, it moves in the upright condition in the capsule receiving hole 49 with its cap facing downwardly towards the axis of rotation of the drum and without movement of the capsule with respect to the drum, from the upper leading-in point to the lower leading-out point, making 180° turning movement. Thus, capsules are fed, with their cap facing upwardly toward the axis of rotation of the drum, in the capsule receiving hole 36 made at the circumferential surface of the capsule receiving disk 35. Numeral 61 is a guide which makes capsules put in with their cap facing upwardly turn completely sideways with cap ends thereof facing the direction of rotation of the drum and prevents capsules from slipping off the drum. When the drum 48 turns, capsules are held in the drum 48 as they are upright or lying down and said guide 61 is necessary only at the part where capsules tend to fall. Since such tendency shifts to the outer circumferential side of the drum at the lower half of the drum, the guide is provided inside at the upper half and is provided outside at the lower half (not shown in the drawings). Numeral 62 is a fixing member which is fitted in the inside of a base for the drum fitting member 54, through the medium of bearings 63, 63, so that the drum fitting member 54 is made rotatable around the fixing member 62. Numeral 64 is an internal gear provided at the inner circumference of the drum fitting member 54. Numeral 65 is a cup provided rotatably, through the medium of bearings 67, 67, to a fixed shaft 66 with its one end fixed to the fixing member 62. A cup turning gear 68, which engages with the internal gear 64, is fixed to the outer circumference at one end of the cup 65. Numeral 69 is a drive gear which is fixed to the top end of a driving shaft 70 rotatably supported by the fixing member 62 and engages with the cup turning gear 68. This drive gear 69 is turned by motive power from the outside (not shown) and drives the cup turning gear 68 and the internal gear 64. Numeral 71 is a stationary gear fixed to the fixed shaft 66 inside the cup 65. Numeral 72 denotes four planetary gears which are provided by dividing the inner surface of the cup into four equal parts and which engage with the stationary gear 71. A small disk 73 having an eccentric pin 74 at the top end thereof is fixed to an axis of rotation 75, the base end of which is rotatably fixed to the cup 65. Numeral 76 denotes means for completing overturning of semi-inverted capsules having cap ends thereof facing the direction of rotation of the drum, the means comprising four adjusting pawls with their base portion rotatably fixed to the eccentric pin 74. Each of these adjusting pawls forks into two branches at its top end so that it may have access to the capsule receiving holes 49, 49 made in two rows in the drum 48. Numeral 77 is a long groove made at the middle part of each adjusting pawl 76. As a guide pin 78 fixed at the outer circumferential part of the cup 65 passes through this slidable long groove, movement of the adjusting pawl 76 is controlled by both of the eccentric pin 74 and the guide pin 78. The planetary gear 72 revolves round the stationary gear 71 and the eccentric pin 74 which effects revolution similar to that of the planetary gear describes a cycloid curve around the stationary gear 71. Since the guide pin 78 acts as a slide guide, with the eccentric pin 74 as center, the top end of the adjusting pawl 76 faces the outer circumference of the drum 48 when it begins to come into contact with a lying down or semi-inverted capsule. When a capsule at a position in relation to the drum at which all of the capsules are ejected from the capsule receiving holes 49 by only gravity stands upright perfectly in this way, the capsule stands upright with its body side 13 facing away from the outer circumference of the drum. This indicates that the capsule stands upright in the same direction as a capsule which fell with its cap 15 facing downwardly when it was supplied to the drum (namely, a capsule which does not require adjustment of direction). Thus, both capsules are arranged in the same direction and are drawn out.

What is claimed is:

1. An apparatus for arranging capped capsules in a definite direction, said capsules having a cap portion which is larger than a body portion, comprising:

a rotatable drum having an outer surface and an inner surface, said drum having capsule receiving holes located around the outer circumference of said drum, said receiving holes passing from said outer surface to said inner surface, each of said receiving holes opening into a slot having a width large enough to allow only a capsule body portion to pass therethrough;

a tumbling device having an upper surface which is located below the inner surface of said drum but which allows said drum to pass freely thereover, said tumbling device having a groove in said upper surface which is located below the inner surface of said drum, said groove having a width large enough to allow only the capsule body portion to pass therethrough, said groove having a depth which decreases in the direction of rotation of said drum such that the body portion of a capsule will be urged up and turned so that the capsule body portion enters said slot of a receiving hole;

adjusting pawls caused to enter said receiving holes to turn each capsule with its body portion located in said slot to a position with the body portion facing the outer circumference of said drum, the number of said pawls being less than the number of receiving holes in said drum, each of said pawls having a top end opposite to a base portion and a groove in the middle thereof;

means for turning an individual pawl comprising a pin which is pivotably attached to the base portion of a pawl, a small disk which is connected to said pin at an eccentric position on said disk;

planetary gear means for rotating said disk, a cup which is within and rotatably connected to said rotatable drum, said cup connected to said planetary gear means for causing said disk to rotate, a guide pin fixedly attached to said cup, said guide pin passing through said groove of one of said pawls;

whereby said turning means causes each pawl to enter a receiving hole and turn a misaligned capsule so that the body portion faces the outer circumference of said drum;

whereby capped capsules which were randomly supplied to receiving holes in a single revolving drum fall freely from the receiving holes with their cap portions all facing the same direction.

2. The apparatus of claim 1 wherein said drum is shaped in the form of a ring, said drum being removable from a drum fitting member which is attached to said means for rotating said drum, whereby drums having receiving holes of different sizes may be used for orienting capsules of various diameters.

3. A method of arranging capped capsules in a definite direction, said capsules having a cap end which is larger than a body end thereof, comprising:

placing a plurality of randomly oriented capsules one-by-one into a plurality of capsule receiving holes located on the surface of a single revolvng drum such that some of said capsules are inverted and have cap ends thereof facing away from an axis of rotation of said drum and the remainder of said capsules have cap ends thereof facing toward said axis of rotation of said drum;

overturning with respect to an outer surface of said drum only those inverted capsules placed in said drum with their cap ends facing away from said axis of rotation of said drum and transporting said remainder of said capsules in said drum with the cap ends thereof facing toward said axis of rotation of said drum without moving said remainder of said capsules with respect to said drum, said overturning of said inverted capsules placed in said drum with their cap ends facing away from said center of rotation of said drum being carried out by first rotating them to a semi-inverted position with the cap ends thereof facing a direction of rotation of said revolving drum while maintaining at least the cap ends thereof in said receiving holes of said revolving drum and then completing said overturning with means located adjacent a position in relation to said drum at which all of said capsules are ejected from said receiving holes, said means completing said overturning by rotating said semi-inverted capsules to a position with cap ends thereof facing toward said axis of rotation; and removing all capsules from said drum by only rotation of said drum such that said capsules fall freely only by gravity from said capsule receiving holes at said capsule ejecting position with cap ends thereof facing said axis of rotation of said drum.

* * * * *